Aug. 23, 1955   L. G. KOPP   2,715,864
TRACTOR HYDRAULIC SYSTEMS
Filed March 15, 1950   5 Sheets-Sheet 4

INVENTOR.
LESTER G. KOPP
ATTORNEYS

Aug. 23, 1955  L. G. KOPP  2,715,864
TRACTOR HYDRAULIC SYSTEMS
Filed March 15, 1950  5 Sheets-Sheet 5

INVENTOR.
LESTER G. KOPP
BY
ATTORNEYS

United States Patent Office 2,715,864
Patented Aug. 23, 1955

2,715,864

TRACTOR HYDRAULIC SYSTEMS

Lester G. Kopp, South Bend, Ind., assignor to Harry Ferguson, Inc., Detroit, Mich., a corporation of Delaware Application March 15, 1950, Serial No. 149,738

2 Claims. (Cl. 97—46.35)

The invention relates to hydraulic power lift systems for tractors and more particularly to improved controls for such systems. A system of the general character contemplated is disclosed in the Ferguson Patent No. 2,118,180, issued May 24, 1938.

The power lift systems provided on tractors are conventionally utilized for raising and lowering the hitch linkage by which an implement is operatively connected with the tractor. Power for effecting such action is applied through a hydraulic actuator or ram supplied with pressure fluid by a pump driven from the tractor engine. Operation of the system is controlled by a valve mechanism arranged for actuation either automatically in response to changes in the draft force imposed on the hitch linkage or manually by means of a suitable control device such as a hand lever.

The primary object of the invention is to make it possible to use the regular hand lever of a hydraulic system of the above general character for controlling an auxiliary hydraulic actuator supplied from the main system's pump and in a manner such that the hand lever is automatically shifted into a position to cut off further fluid delivery when the actuator completes its travel.

Another object is to provide for quickly shifting the control lever of the tractor hydraulic system into a position to interrupt the pump action without intervention of the tractor operator when the pressure in the system reaches a predetermined value.

Still another object is to arrange the mechanism so that the pressure at which the cutoff takes place can be changed at will and regulated with a high degree of accuracy.

A further object is to provide mechanism particularly well adapted for converting existing tractor hydraulic systems for the operation of auxiliary hydraulic actuators, which mechanism is inexpensive to manufacture and simple to install, which is operable by the manual control lever forming a part of the hydraulic system, and which is adapted to operate through such control lever to regulate the action of the pump.

Other objects and advantages of the invention will become apparent from the following detailed description of the preferred embodiment illustrated in the accompanying drawings, in which.

Figure 1:
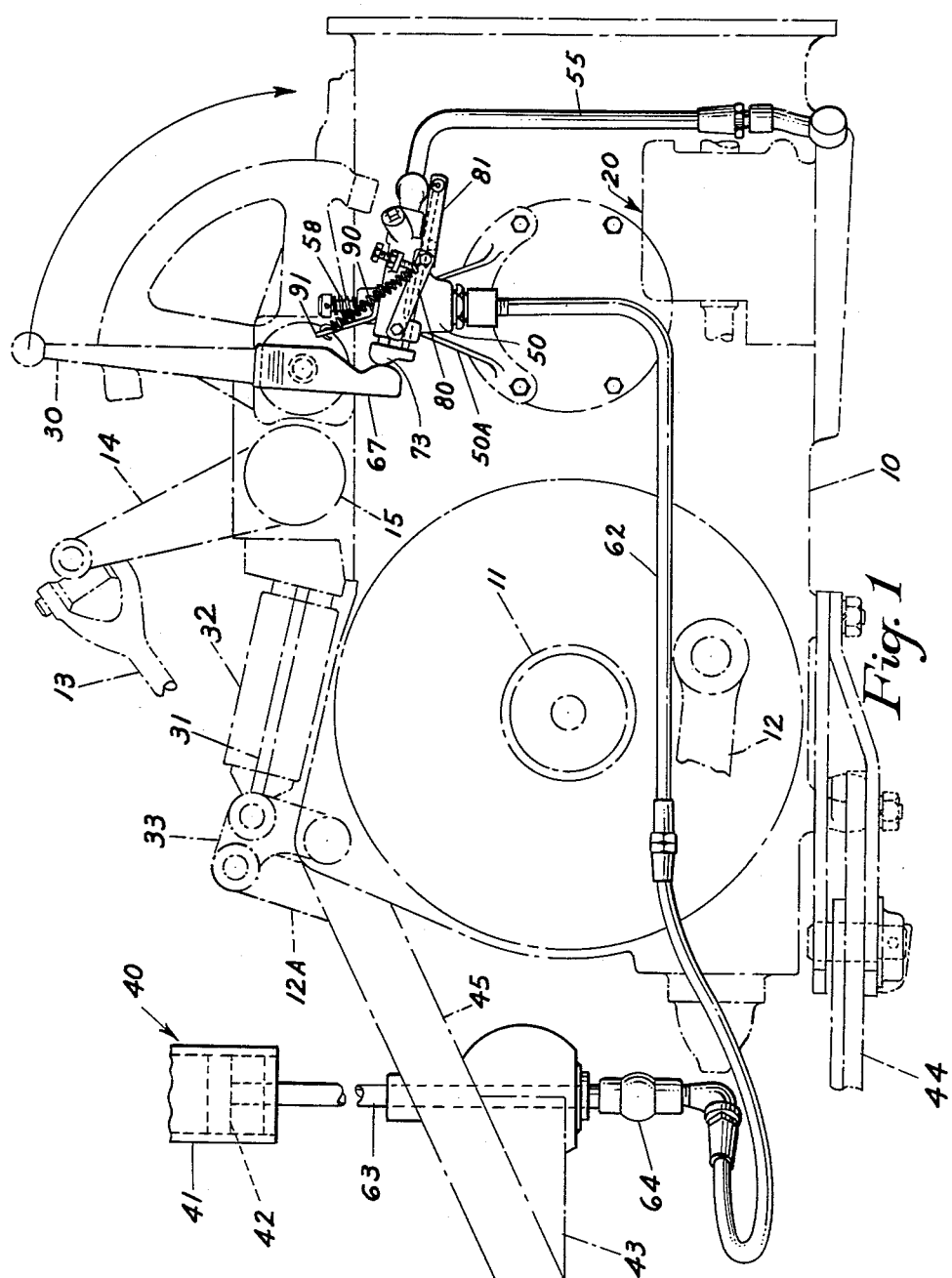
Figure 1 is a fragmentary side elevation of the rear portion of the tractor and the front portion of an implement connected thereto showing the conversion mechanism of the present invention associated therewith.

While the preferred embodiment of the invention has been shown in the drawings and will be described herein in detail, it is not intended to limit the invention to the specific form disclosed. On the contrary, the intention is to cover all modifications and alternative constructions and arrangements which fall within the spirit and scope of the invention as expressed in the appended claims.

In the preferred form herein disclosed the conversion mechanism constituting the invention is in the nature of an auxiliary or attachment applicable to tractors equipped with the well-known Ferguson System. When installed in the tractor, the mechanism becomes an integrated part of the tractor hydraulic system and adapts the system for the operation of auxiliary hydraulic actuators. In view of this integration it will be helpful to an understanding of the invention to consider briefly the construction and mode of operation of the tractor hydraulic system preliminary to a description of the invention itself.

Referring to Fig. 1 of the drawings, there is shown by way of illustration the center housing 10 of a lightweight tractor equipped with a hydraulic system of the type disclosed in the Ferguson patent previously referred to. It will be understood, of course, that this portion of the tractor is located between the rear drive wheels of the tractor which are carried by a rear axle 11 projecting at opposite sides of the housing. For attaching certain types of implements to the tractor, hitch links 12 and a top link 12a are arranged in trailing relation to the tractor, the hitch links being universally pivoted at opposite sides of the housing 10.

Figure 6:
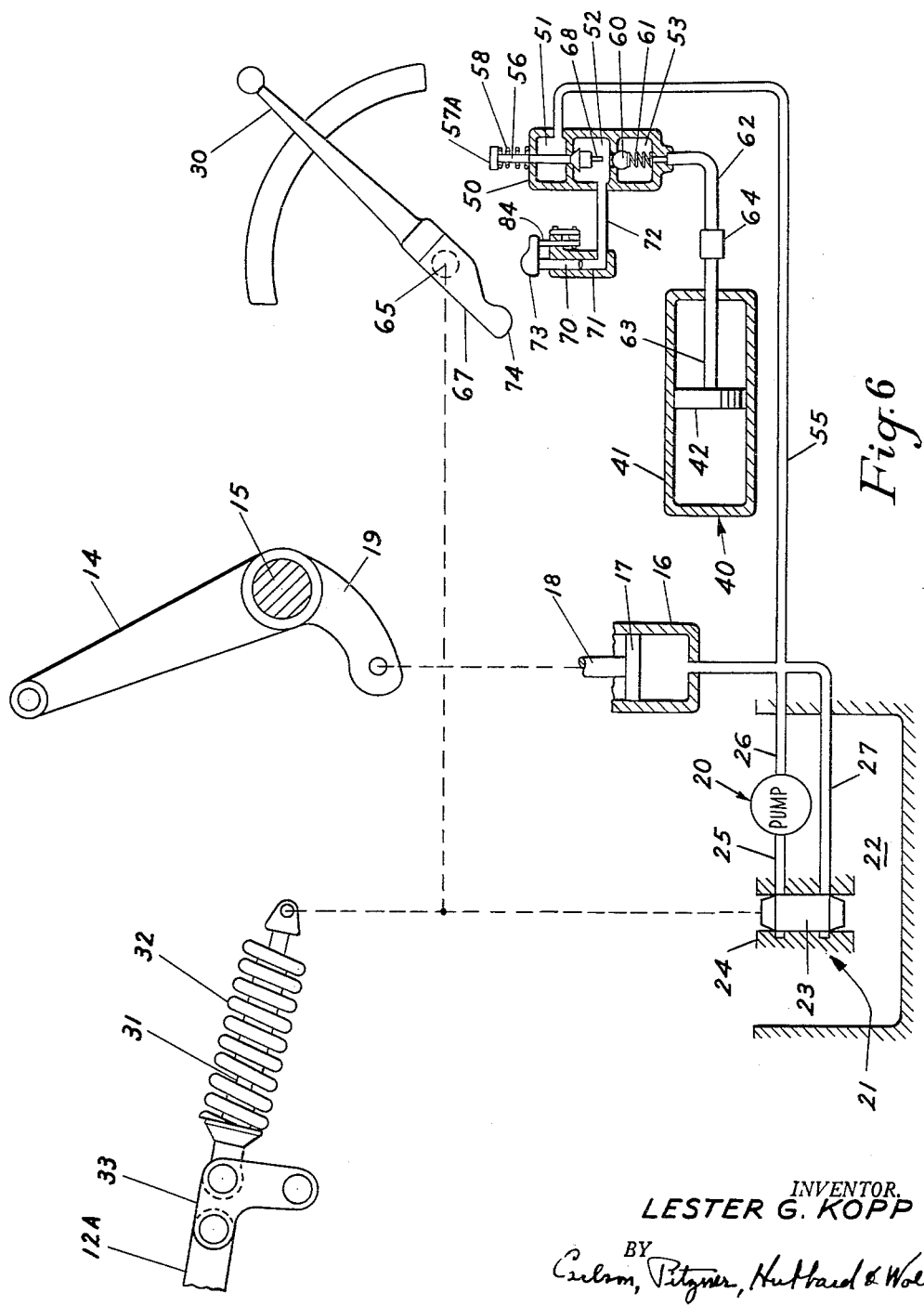
Fig. 6 is a schematic layout of the hydraulic system of the tractor shown in Fig. 1.

The hitch links 12 are normally arranged to be swung vertically for raising or lowering a detachably connected implement, such swinging being effected by hydraulic apparatus incorporated in and powered from the tractor. To this end the hitch links 12 are supported by drop links 13 (Fig. 1) from cranks 14 rigid with a transverse rockshaft 15 journaled on the housing 10. The rockshaft is rotatable for lifting the hitch links by a main hydraulic actuator or ram comprising a cylinder 16 (Fig. 6) and working piston 17. The latter is operatively connected by a rod 18 with a crank 19 rigid with the shaft 15.

Pressure fluid is supplied to the ram by a pump 20 driven from the tractor engine and under control of valve mechanism 21. This pump and the associated valve mechanism are mounted within the housing 10, the lower portion of which constitutes a sump or reservoir 22 for the fluid utilized in the hydraulic system. The valve mechanism 21 in the preferred form shown in Fig. 6 comprises a plunger 23 shiftable axially within a casing 24 from a central or neutral position in which it is shown, in either direction to what may be called the "raising" and "lowering" positions. When shifted downward (as viewed in Fig. 6) or toward the "raising" position, the plunger 23 uncovers an intake passage 25 for the pump 20 and the pump delivers fluid under pressure by way of a conduit 26 into the ram cylinder 16. When the valve plunger is shifted in the opposite direction or toward the "lowering" position, the pump intake remains closed so that no fluid is delivered to the ram by the pump and the drain conduit 27 is opened permitting fluid to exhaust slowly from the ram cylinder into the sump 22. In the central or neutral position of the valve plunger, both the inlet and drain passages are blocked so that the elements operated by the ram are effectively locked against movement in either direction.

In the normal operation of the tractor, the valve plunger 23 is positioned jointly by a manually operable control or quadrant lever 30 (Figs. 1 and 6) and by means responsive to the draft load imposed on the hitch linkage. The draft responsive means as herein shown includes a push rod 31 with which is associated a relatively stiff control spring 32. One end of the push rod is connected to a rocker or clevis 33 which, in turn, is connected with the implement through the top link 12ᵃ. The other end of the push rod projects into the housing and is operatively associated through a suitable linkage with the valve plunger 23. The construction and operation of this mechanism is described in detail in the above-mentioned Ferguson patent. For present purposes it is sufficient to note that the arrangement is such that movements of the push rod in response to changes in the draft load on the hitch linkage impart appropriate movements to the valve plunger to start or stop the pumping action so as to maintain the linkage in a position determined by the setting of the hand lever 30. The hand lever of course acts through the same valve operating linkage as the push rod and provides a means whereby the valve plunger may also be selectively positioned irrespective of the action of the draft responsive means.

The present invention materially increases the utility of a tractor hydraulic system of the type above described by converting it to serve as a source of power and control for an auxiliary hydraulic actuator 40, herein shown as comprising a cylinder 41 and working piston 42. The auxiliary actuator may be stationarily supported or may be mounted on and constitute a part of an implement adapted to receive its motive power from the tractor, but not designed to function with the tractor power lift. An implement of this character, the forward portion of which is indicated at 43 in Fig. 1, may be connected with the tractor in any suitable manner as by a swinging drawbar 44 attached to the housing 10. As the regular hitch linkage is not used under those conditions, the lower links 12 are secured in fixed position as by rigid stays 45 which serve to restrain the main hydraulic actuator against operation when the pump 20 is operated to supply pressure fluid to the auxiliary actuator 40.

In accordance with the invention the mechanism by which the conversion of the tractor hydraulic system is effected is constructed and arranged to provide a pressure fluid connection from the pump 20 of the tractor hydraulic system to the auxiliary actuator 40. Auxiliary valve means interposed in this connection supplements the action of the regular hydraulic system controls and provision is made for automatically interrupting the delivery of fluid to the auxiliary actuator in a quick and sure manner when a predetermined pressure head is developed in the hydraulic system, as when the actuator reaches the end of its working stroke or when a predetermined resistance is opposed to its further operation. This automatic interruption or cutoff of fluid delivery is of particular importance since the regular cutoff action of the tractor draft responsive means does not take place when the hitch links are secured against movement as in the present instance.

Figure 3:
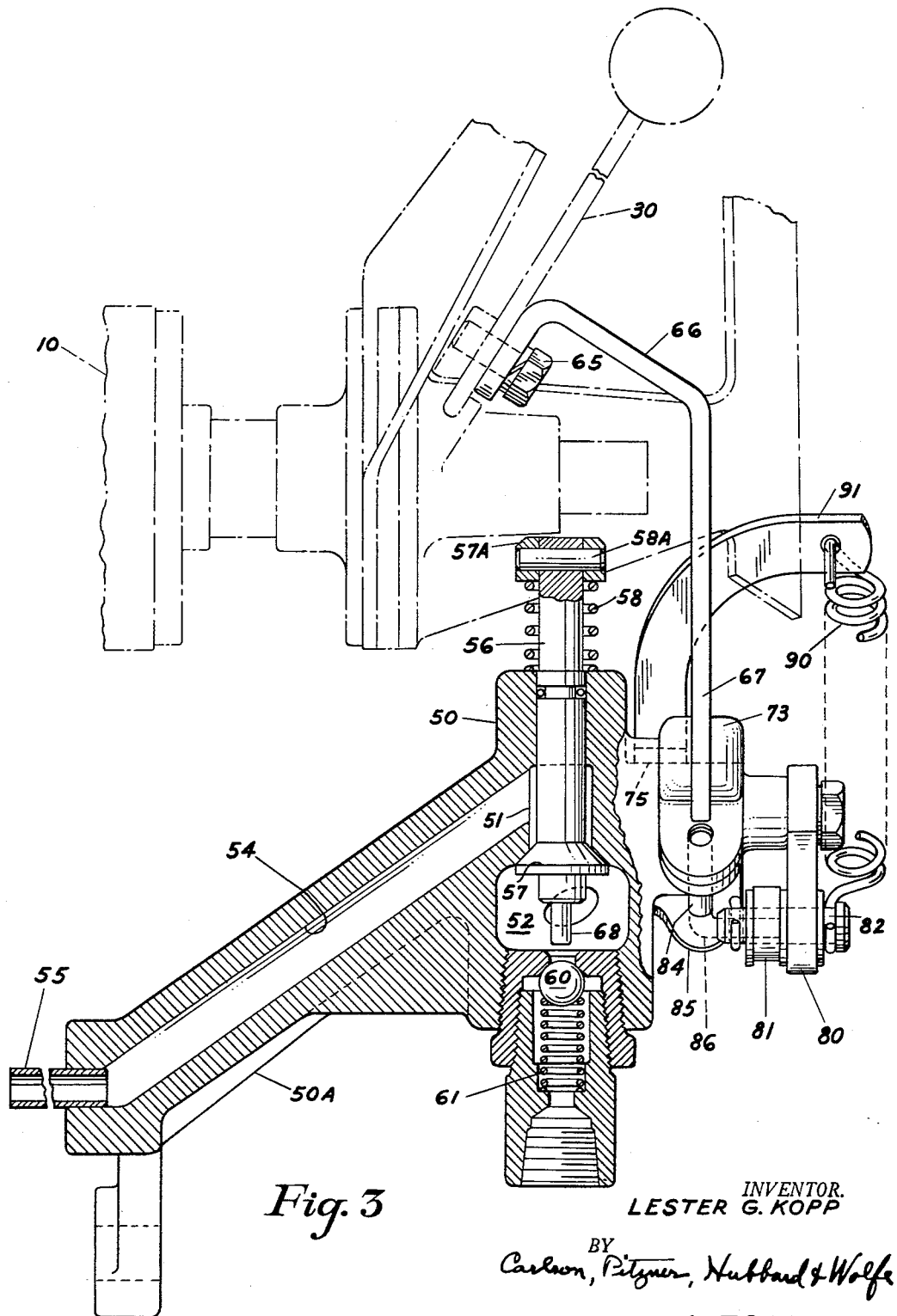
Fig. 3 is a view of the mechanism taken at right angles to the view shown in Fig. 2 with the valve portion of the mechanism sectioned on the line 3—3 of Fig. 2.

In the preferred form of the invention, the auxiliary valve means and the pressure responsive control means are incorporated in a unitary structure adapted to be bolted or otherwise removably attached to the side of the housing 10 adjacent the pivot of the quadrant lever 30, as will be seen by reference to Fig. 1. As shown in Fig. 3, this structure includes an elongated casing 50 integrally formed with a bracket 50ᵃ apertured to receive the same bolts which secure the usual access plate in place on the tractor housing. The casing 50 is formed with three interconnected chambers 51, 52 and 53. The upper chamber 51 is connected to receive fluid from the pump 20 by way of a passage 54 formed in the casing and a conduit 55 connected to the tractor hydraulic system in parallel with the conduit 26 leading to the main actuator.

A valve member in the form of a plunger 56 having a generally conical head 57 urged against a tapered seat in the casing by a spring 58 interposed between the casing and a collar 57ᵃ secured to the projecting end of the plunger as by a cross pin 58ᵃ permits fluid flow from the chamber 51 to the chamber 52, but normally prevents flow in the reverse direction. Fluid flow between the chambers 52 and 53 is similarly restricted by a check valve, herein shown as a ball valve member 60 yieldably held in a position by a spring 61 to block the passage connecting the two chambers.

A conduit 62 (Figs. 1 and 6) connects the chamber 53 to the auxiliary actuator 40. In the exemplary embodiment of the invention, the cylinder 41 of the actuator is movable relative to the piston 42 which is carried by a stationarily supported piston rod 63. Conduit 62 is connected to the piston rod by a coupling 64, the rod being tubular in form and defining an inlet passage for the cylinder 41.

With the above arrangement, the auxiliary actuator 40 may be operated to any desired position and locked in that position by manipulating the quadrant lever 30 in precisely the same manner as for positioning an implement attached to the hitch linkage of the tractor. Thus, when the lever is swung upwardly to the "raising" position, the main valve plunger 23 is shifted so as to admit fluid to the pump 20 which delivers fluid under pressure to the auxiliary actuator by way of valves 57 and 60 and conduit 62. Upon shifting of the quadrant lever to the neutral position, supply of pressure fluid is cut off by plunger 23 and further movement of the auxiliary actuator is interrupted. Return movement of the auxiliary actuator by the load imposed on it is prevented by the check valves 57 and 60 as well as by the blocking action of the valve plunger 23 with respect to the exhaust conduit 27.

To afford control of auxiliary actuator release or return by the quadrant lever, the valve and control assembly is supported with the projecting end of the valve plunger 56 positioned so that the plunger is depressed as an incident to the movement of the quadrant lever to the "lowering" or exhaust position. As herein shown, depression of the valve plunger is effected by an extension of the quadrant lever herein shown as a bracket attached to the lever as by a bolt 65 for movement as a unit with the lever. The bracket as shown has an intermediate portion 66 projecting generally laterally from the lever and an end portion 67 extending at an angle to but generally downwardly across the pivotal axis of the lever. The intermediate portion 66 of the bracket is disposed so that as the quadrant lever is swung downwardly it engages the plunger 56 and shifts it downwardly to establish communication between the valve chambers 51 and 52.

Communication is also established between the valve chambers 51 and 53 incident to displacement of the valve member 60 by an extension 68 at the lower end of the plunger 56. Thus a passage is opened for the exhaust of fluid from the auxiliary actuator through the valve mechanism, passage 54, conduit 55 and outlet passage 27 controlled by the main valve plunger 23. It will be understood, of course, that the movement of the quadrant lever to its fully lowered position shifts the valve plunger 23 out of blocking relation to the passage 27.

Turning now to the automatic cutoff action of the conversion mechanism, an important consideration is that this action is carried out through the regular manual controls of the tractor hydraulic system. As explained above the conversion mechanism is connected with the tractor hydraulic system in a manner such that pressure fluid is supplied to the auxiliary actuator when the quadrant lever is moved to the "raising" position. In accordance with the present invention a pressure responsive control device incorporated in the conversion mechanism is arranged to flip the quadrant lever away from the "raising" position with a snap action and thereby interrupt the delivery of pressure fluid to the auxiliary actuator immediately upon the development of a predetermined pressure head in the hydraulic system. This pressure head, of course, will be lower than that determined by the setting of the main pressure relief or safety valve of the system. It is therefore effective to limit the load which may be raised by the auxiliary actuator to a value less than that required to blow the safety valve.

Figure 5:
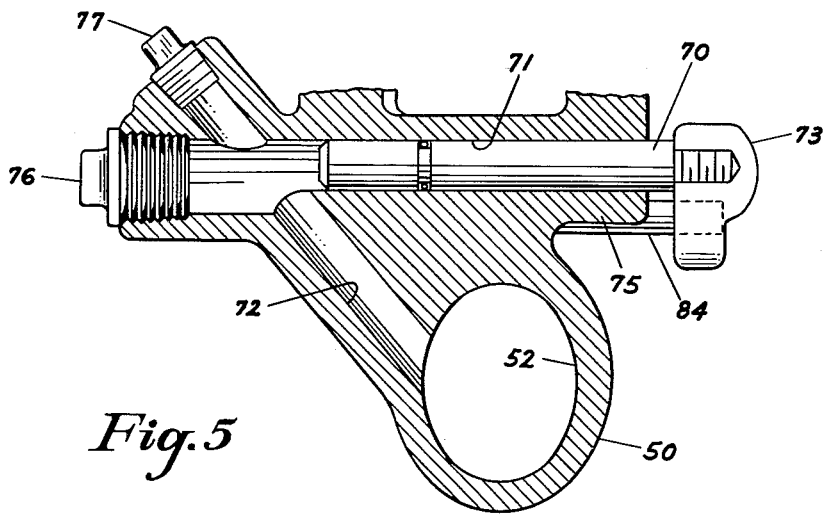
Fig. 5 is a sectional view taken in a plane substantially on the line 5—5 of Fig. 4.

The pressure responsive control device in its preferred form comprises a plunger 70 (Figs. 5 and 6) reciprocable in a cylinder 71 communicating through a passage 72 with a suitable part of the hydraulic system, in this instance with the chamber 52 of the valve mechanism. As will be seen by reference to Fig. 2, the cylinder and plunger 70 are arranged at an angle to the axis of the valve casing 50 so that the path of movement of the plunger is substantially normal to the longitudinal axis of the quadrant lever 30 when the lever is in the "raising" position. Moreover, the cylinder 71 is located so as to aline the plunger 70 with the depending section 67 of the quadrant lever bracket. Preferably the plunger is provided at its projecting end with a head 73 engageable with a contact surface 74 adjacent the free end of the bracket section, the contact surface and the cooperating surface of the head being rounded to permit relative sliding movement therebetween as the lever is rocked by advance of the plunger.

For convenience of manufacture and assembly, the cylinder 71 may be formed as by drilling a hole through an elongated boss 75 integral with the valve casing 50 and disposed at an angle thereto so as to properly locate the plunger with respect to the quadrant lever bracket. The passage 72 likewise may be drilled through the boss 73 and into the valve casing so as to intersect the cylinder 71 and the valve chamber 52. The outer ends of the drilled holes forming the cylinder and passage are closed respectively by screw plugs 76 and 77.

Figure 2:
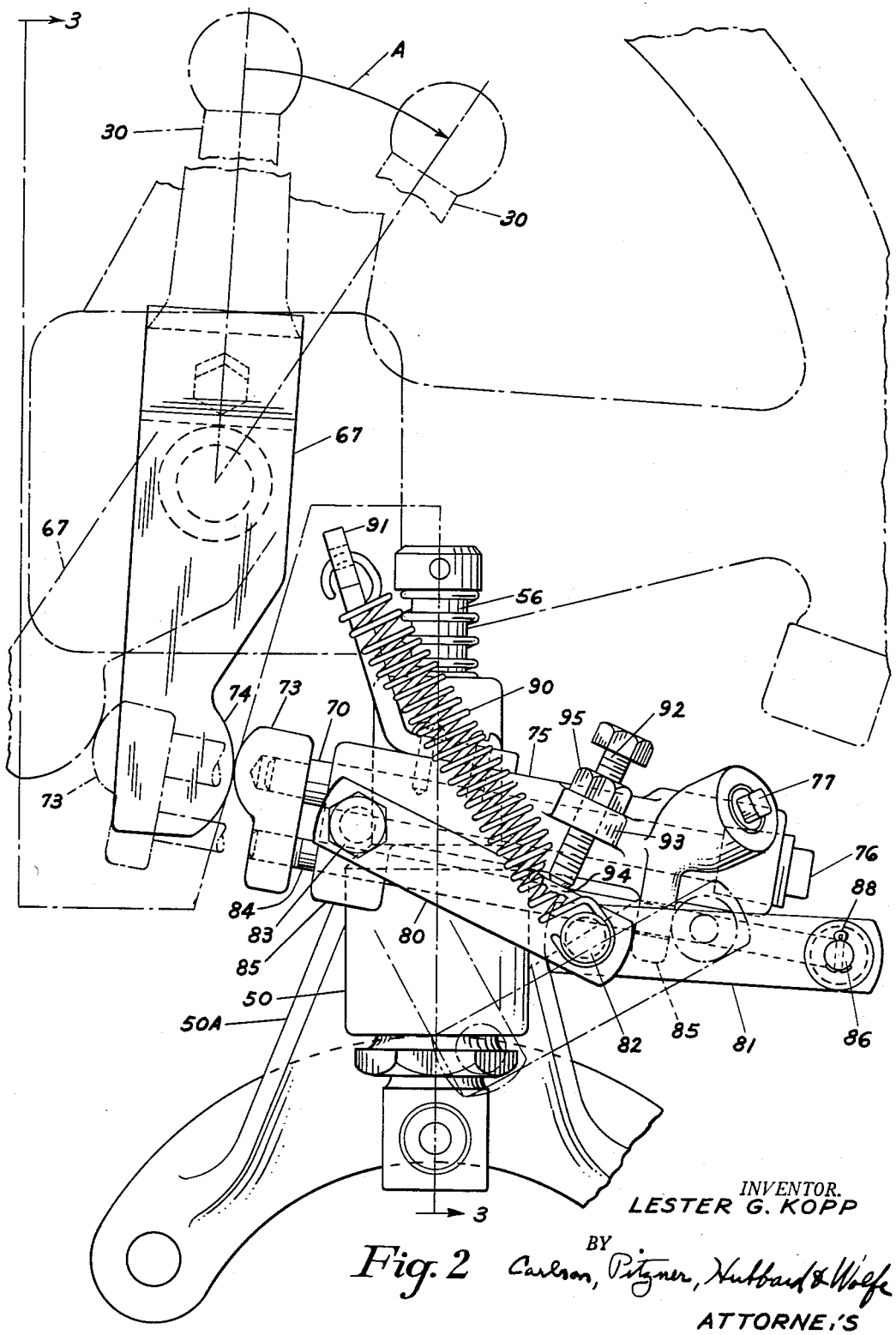
Fig. 2 is an enlarged side view of the conversion mechanism showing its association with the manual control means of the tractor.

With the above arrangement, a part of the fluid supplied by the pump 20 is diverted through the passage 72 to the cylinder 71 and this fluid tends to move the plunger 70 outwardly or in a direction to swing the quadrant lever 30 away from the substantially upright "raising" position in which it is shown in full in Fig. 2. Preferably the construction is such as to provide a range of piston travel effective to swing the quadrant lever through an angle somewhat less than 90° as indicated by the arrow "A" in Fig. 2. In such movement the quadrant lever is effective to shift the main valve plunger 23 to shutoff position, but not far enough to initiate exhaust of fluid from the system.

To guard against a partial or a premature interruption of the fluid supply and to insure complete and substantially instantaneous cutoff of the same at the proper time, provision is made for opposing a substantial resistance to movement of the plunger 70 until a predetermined pressure head is developed in the hydraulic system and thereafter quickly removing or substantially reducing the resistance. This permits the plunger so advance rapidly through its full stroke and flip the quadrant lever 30 out of "raising" position with what may be termed a snap action.

Figure 4:
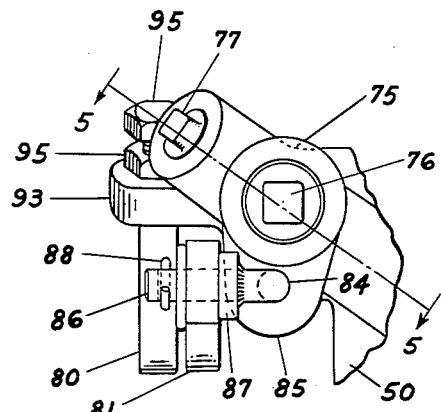
Fig. 4 is a fragmentary rear end view of a part of the mechanism shown in the preceding figures.

In its preferred form the means for restraining and suddenly releasing the plunger 70 for movement comprises a toggle linkage including a pair of rigid links 80 and 81 assembled with their ends overlapping and pivotally connected together by a pin 82. One of the links, in this instance the link 80, is pivotally secured at its other end by a pin 83 to the boss 75 adjacent the forward or open end of the cylinder 71. The other end of the companion link 81 is operatively connected with the plunger 70 through the medium of a rod 84 rigidly secured to the head 73 and extending rearwardly therefrom substantially parallel to the plunger. Lugs 85 depending from the boss 75 are apertured to receive and guide the rod 84. At the end remote from the head 73, the rod is bent transversely as at 86 and engaged in an aperture in the link 81. As shown in Fig. 4 the parts are held in assembled relation by a fixed collar 87 on the bent portion of the rod and a cotter pin 88 inserted through the rod on the opposite side of the link.

A spring 90 connected between the pivot pin 82 and a bracket 91 mounted on the boss 75 yieldably urges the links 80 and 81 toward a straight-line relation. The plunger 70 is thus urged rearwardly of the cylinder 71 or toward the retracted position in which it is shown in Fig. 2. Upon forward movement of the plunger the links are folded together or into the position in which they are shown in broken lines in Fig. 2.

As is the case with any toggle mechanism, the force required to shift the links into a folded position approaches infinity as the angle between the links approaches 180°, but decreases rapidly as the angle between the links decreases. Advantage is taken of this characteristic of the toggle mechanism to oppose a relatively high resistance to the initial advance of the plunger while offering relatively little resistance to its movement after the advance has started.

To determine the initial force required to start the plunger or, in other words, the pressure head required to initiate the cutoff action, stop means is provided for restraining the links 80 and 81 into exact alinement and for retaining them in predetermined angular relationship. This stop means, as herein shown, comprises a stop screw 92 threaded through a lug 93 projecting laterally from the boss 75. The lower end of the stop screw is positioned for engagement by a fixed stop element 94 rigid with the link 80. Adjustment of the normal angle between the links and thus of cutoff point or pressure may therefore be effected quickly and easily by appropriate setting of the stop screw. A lock nut 95 threaded on the stop screw holds it in adjusted position.

In the operation of a tractor equipped with the conversion mechanism of the present invention, the delivery of pressure fluid to the auxiliary actuator is initiated by simply shifting the quadrant lever 30 to its upper or "raising" position. Operation of the auxiliary actuator may be interrupted at any time by rocking the quadrant lever to an intermediate position to stop the pumping action of the pump 20. Under these conditions the auxiliary actuator is locked in operated position by the action of the check valves 57 and 60. Release and return of the auxiliary actuator is initiated by swinging the quadrant lever to full "lowering" position in which it acts through the plunger 56 to open the check valves and permit exhaust of fluid from the auxiliary actuator.

In the event that the operation of the auxiliary actuator is not interrupted manually before it completes its stroke or if the resistance opposed to its further operation exceeds a predetermined value, the pressure fluid supply to the auxiliary actuator is automatically cut off by the pressure responsive device including the plunger 70 and associated toggle linkage. More particularly, upon development of a predetermined pressure in the hydraulic system, the plunger is advanced to fold the toggle links 80, 81 which, with the cooperation of the spring 90 impose a substantial resistance to initial movement of the plunger. This resistance decreases rapidly as the angle between the links decreases and the plunger is thus enabled to advance rapidly and flip the quadrant lever to an intermediate or cutoff position. The quadrant lever of course is operative in such movement to shift the main valve plunger 23 to neutral position and thereby interrupt the pumping action of the pump 20. The cutoff pressure may be varied at will by simply setting the stop screw 92 to hold the links in a selected angular position.

The conversion mechanism is simple in construction and is easy to install in the tractor. Through its operation the utility of the tractor hydraulic system is materially enhanced since it adapts the tractor for the performance of many tasks that would otherwise require a separate source of power.

I claim as my invention:

1. A pressure responsive control device comprising, in combination, a casing defining a cylinder, a plunger reciprocable in said cylinder and projecting at one end thereof, means for introducing pressure fluid into said cylinder to advance the plunger, a head mounted on the projecting end of the plunger, a rod rigid with and extending rearwardly from said head along the side of said casing substantially parallel with said plunger, toggle mechanism biasing said plunger toward a retracted position including a pair of rigid links pivotally connected together at one end and respectively pivoted at their other ends to said casing and to said rod, spring means acting on said links to urge them toward alined position and thereby resist advance of said plunger, the resistance opposed to plunger advance decreasing substantially as the angle between the links decreases, and adjustable means carried by said casing engaging one of said links to determine the limit position to which the links may be swung by said spring means.

2. An attachment for a tractor having a power lift including a main hydraulic actuator, a pump supplying fluid under pressure, valve mechanism and a hand lever for shifting said valve mechanism between a first position in which the pump is caused to supply fluid to the actuator, a second position in which fluid is locked in the actuator and the supply of fluid from the pump is interrupted, and a third position in which the fluid supply from the pump is interrupted and exhaust of fluid from the actuator is initiated, said attachment comprising a valve casing defining a first chamber connected to receive fluid from said pump, a second chamber adapted to be connected to an auxiliary actuator, and a third chamber intermediate said first and second chambers, valve means biased to permit flow of fluid from said first chamber to said second chamber and to shut off fluid flow in the reverse direction, other valve means biased to permit flow of fluid from said third chamber to said second chamber and to shut off fluid flow in the reverse direction, a plunger operative when actuated to open both of said valves, means supporting said valve casing with said plunger positioned for engagement by the hand lever when moved to shift said valve mechanism to its third position, a pressure responsive device including a cylinder carried on said valve casing and in communication with said third chamber, a plunger reciprocable in said cylinder, means normally opposing a predetermined force against the movement of said plunger by the pressure of the fluid in said third chamber, said means being constructed and arranged so that the opposing force exerted by said means is substantially reduced following the initial movement of the plunger thereby promoting further rapid movement of the plunger to fully extended position, said cylinder being located on said valve casing to position said plunger for engaging the hand lever and shifting the lever from its first to its second position.

References Cited in the file of this patent

UNITED STATES PATENTS

| Number | Name | Date |
|---|---|---|
| 917,603 | Hench | Apr. 6, 1909 |
| 1,140,428 | Winter | May 25, 1915 |
| 1,804,599 | Edel | May 12, 1931 |
| 1,841,901 | Mabey | Jan. 19, 1932 |
| 1,907,538 | Hanna | May 9, 1933 |
| 2,184,793 | Clench | Dec. 26, 1939 |
| 2,213,401 | Lindgren | Sept. 3, 1940 |
| 2,243,364 | Trautman | May 27, 1941 |
| 2,397,042 | Pfost | Mar. 19, 1946 |
| 2,462,722 | Court | Feb. 22, 1949 |
| 2,539,977 | Staude | Jan. 30, 1951 |
| 2,574,137 | Zenner | Nov. 6, 1951 |
| 2,592,393 | Chambers | Apr. 8, 1952 |
| 2,627,796 | Bunting | Feb. 10, 1953 |